(12) United States Patent
Haack

(10) Patent No.: US 8,177,166 B2
(45) Date of Patent: May 15, 2012

(54) TAIL STRUCTURE FOR AN AIRCRAFT OR SPACECRAFT

(75) Inventor: Cord Haack, Beckdorf (DE)

(73) Assignee: Airbus Deutschland GmbH, Hamburg (DE)

( * ) Notice: Subject to any disclaimer, the term of this patent is extended or adjusted under 35 U.S.C. 154(b) by 286 days.

(21) Appl. No.: 12/300,667

(22) PCT Filed: Jun. 13, 2007

(86) PCT No.: PCT/EP2007/055828
§ 371 (c)(1),
(2), (4) Date: Jan. 15, 2009

(87) PCT Pub. No.: WO2007/144377
PCT Pub. Date: Dec. 21, 2007

(65) Prior Publication Data
US 2011/0101163 A1    May 5, 2011

Related U.S. Application Data

(60) Provisional application No. 60/813,497, filed on Jun. 14, 2006.

(30) Foreign Application Priority Data

Jun. 14, 2006    (DE) .......................... 10 2006 027 707

(51) Int. Cl.
*B64C 1/00*    (2006.01)

(52) U.S. Cl. ......................................... 244/119; 244/54

(58) Field of Classification Search .................. 244/119, 244/130, 54, 12.4, 25, 36, 55, 123; 242/54; 138/148
See application file for complete search history.

(56) References Cited

U.S. PATENT DOCUMENTS

| 2,097,600 | A | * | 11/1937 | Pavlecka | 138/115 |
| 3,109,614 | A | * | 11/1963 | Steidl | 244/87 |
| 3,666,211 | A | * | 5/1972 | Cathers et al. | 244/54 |
| 4,149,688 | A | * | 4/1979 | Miller, Jr. | 244/12.4 |
| 4,448,372 | A | * | 5/1984 | Larson | 244/87 |
| 4,962,904 | A | * | 10/1990 | Perry et al. | 244/131 |
| 5,501,414 | A | * | 3/1996 | Bauer | 244/124 |
| 5,718,952 | A | * | 2/1998 | Zimmermann et al. | 428/34.1 |

(Continued)

FOREIGN PATENT DOCUMENTS

DE    69712797    11/2002

(Continued)

OTHER PUBLICATIONS

Decision on Granting from the Federal Service for Intellectual Property, Patents and Trademarks (ROSPATENT), in corresponding application RU 2008148159/11(063094).

*Primary Examiner* — Joshua J Michener
*Assistant Examiner* — Medhat Badawi
(74) *Attorney, Agent, or Firm* — Greer, Burns & Crain, Ltd.

(57) ABSTRACT

A tail structure for an aircraft or spacecraft, which adjoins a fuselage section of the aircraft or spacecraft, includes a support construction for supporting at least one craft component, and a bulkhead unit intended for the pressure-tight sealing of the fuselage section and able to be coupled both to the support construction and to the fuselage section so as to form a force flow path between the at least one craft component and the fuselage section.

7 Claims, 6 Drawing Sheets

U.S. PATENT DOCUMENTS

| | | | | |
|---|---|---|---|---|
| 5,908,175 | A * | 6/1999 | Magnes | 244/119 |
| 6,701,967 | B2 * | 3/2004 | Louis et al. | 138/108 |
| 7,562,845 | B2 * | 7/2009 | Schoene | 244/119 |
| 7,896,289 | B2 * | 3/2011 | Verde Preckler et al. | 244/91 |
| 2002/0179772 | A1 * | 12/2002 | Ohmer et al. | 244/119 |
| 2008/0099611 | A1 * | 5/2008 | Martino Gonzalez et al. | 244/119 |
| 2008/0142641 | A1 * | 6/2008 | Moore et al. | 244/215 |
| 2008/0179459 | A1 * | 7/2008 | Garcia Laja et al. | 244/119 |
| 2008/0191088 | A1 * | 8/2008 | Diochon et al. | 244/54 |
| 2009/0000681 | A1 * | 1/2009 | Averbuch et al. | 138/112 |
| 2010/0018599 | A1 * | 1/2010 | Ferrer et al. | 138/112 |
| 2010/0230539 | A1 * | 9/2010 | Mischereit et al. | 244/119 |

FOREIGN PATENT DOCUMENTS

| | | |
|---|---|---|
| EP | 1764305 | 3/2007 |
| RU | 2 167 788 | 4/1998 |
| RU | 2 274 584 | 10/2003 |

* cited by examiner

TAIL STRUCTURE FOR AN AIRCRAFT OR SPACECRAFT

FIELD OF THE INVENTION

The present invention relates to a tail structure for an aircraft or spacecraft, in particular a tail structure which directly adjoins a fuselage section of the aircraft or spacecraft. The present invention also relates to an aircraft or spacecraft comprising the tail structure according to the invention.

BACKGROUND OF THE INVENTION

Although the present invention is described with reference to an aircraft having a fuselage of monocoque construction, the present invention is not restricted thereto.

The fuselage of commercial aircraft is produced using a so-called monocoque construction. An outer skin of the fuselage here forms the force-bearing structure. Longitudinally acting forces and torsional forces acting perpendicularly to the longitudinal direction in the circumferential direction are transferred inter alia from the wings, the engines and the stabilizing unit into the outer skin. The high mechanical rigidity of the outer skin with respect to the acting forces is achieved by virtue of the substantially tubular structure of the fuselage, that is to say a structure having a circular or elliptical cross section. Within the monocoque structure are provided longitudinally extending stringers and frames which are arranged transversely to the stringers and which correspond to the cross section of the fuselage. The stringers and frames prevent the possibility of bulges or dents being formed in the skin which could reduce the mechanical load-bearing capacity of the outer skin with respect to longitudinal, transverse or torsional forces.

The construction of a monocoque fuselage is based primarily on its mechanical rigidity, which means that the aerodynamic properties of the fuselage are adversely affected to some extent or that they always entail a compromise being made.

One or more engines can be arranged in a tail section. These engines require specific air inflow conditions for optimum operation. In principle, air can be caused to flow in a targeted manner by providing the outer skin with an aerodynamic design. However, the aerodynamic design and the design in terms of the mechanical rigidity of the outer skin can typically be combined only to a limited extent.

SUMMARY OF THE INVENTION

One of the objects on which the invention is based is to provide an improved design possibility in terms of the aerodynamic property of an aircraft.

Accordingly, a tail structure which adjoins a fuselage section, particularly a fuselage section of an aircraft or spacecraft, includes a support construction for supporting at least one craft component; and a bulkhead unit for pressure-tight sealing of the fuselage section, the bulkhead unit being able to be coupled both to the support construction and to the fuselage section so as to form a force flow path between the at least one craft component and the fuselage section; wherein the support construction comprises two pylons forming the force flow path for supporting a respective engine, and wherein the pylons are formed by a parallelepiped-defining support bar construction with at least one support bar extending diagonally in the parallelepiped. Also disclosed is an aircraft or spacecraft comprising such a tail structure.

The idea behind the present invention involves the provision of a support construction which is independent of the fuselage section. The forces transferred into the support construction from craft components are transmitted to a bulkhead unit which can itself be coupled to the fuselage section. Hence, the bulkhead unit can propagate these forces to the fuselage section. The bulkhead unit according to the invention thus has a dual function. On the one hand, it is intended to seal the fuselage section in a pressure-tight manner in order to maintain an internal pressure in the passenger compartment, cargo hold, etc., that is higher than the surrounding pressure, and, on the other hand, it serves as a mechanical coupling piece between the fuselage section and the tail structure. Since the forces acting on the tail structure are absorbed and borne by the support structure, the outer casing or a fairing of the tail structure can be optimized in terms of optimum airflow conditions.

The bulkhead unit may be a planar bulkhead unit. The two delimiting main surfaces of the bulkhead unit are substantially parallel to one another. However, this does not exclude the possibility of integrating further elements in the bulkhead unit which protrude from the main surfaces.

In one embodiment, the fuselage section comprises a monocoque structure with a stressed outer casing, longitudinally extending stringers and frames arranged perpendicularly to the stringers in the circumferential direction. Such a fuselage section advantageously has a low weight combined with high mechanical rigidity. The bulkhead unit may be coupled to the stringers via coupling elements in order to form a force flow path with the fuselage section.

According to a further embodiment, the support construction comprises a support bar construction to form the force flow path. The support construction here may comprise double-walled support bars. Since the support bar construction transmits the forces from the craft component and the forces on the part of the fuselage section, it is possible for an outer casing or a fairing of the tail structure to be optimized in terms of aerodynamic properties. There is no need to take into account the mechanical load-bearing capacity of the outer casing of the tail structure.

According to a further embodiment, the support construction comprises one or two pylons for supporting a respective engine. The pylons may be formed by a parallelepiped-defining support bar construction with at least one support bar extending diagonally in the parallelepiped. The pylons may have their own covering. Within the resulting sealed space it is possible to arrange supply lines to the engines and/or to bleed off the waste heat from the engines. This waste heat can be used to heat the passenger compartments.

The craft component may comprise a stabilizing component and/or a propulsion component. The stabilizing component here may comprise a horizontal stabilizer and/or a vertical stabilizer and/or a trim spindle for a horizontal stabilizer and/or a vertical stabilizer.

In one variant, the stabilizing unit and the bulkhead unit are coupled together via at least two oblique struts which each comprise a first suspension point in a connection region of the stabilizing unit and a second suspension point along the vertical axis of symmetry of the bulkhead unit.

In one embodiment, the bulkhead unit is a planar bulkhead unit. Furthermore, the bulkhead unit may comprise a pressure dome. Moreover, the bulkhead unit may comprise internal bracing for absorbing torsional forces which act radially about a longitudinal direction of the tail structure.

According to a further embodiment, the support construction can be coupled to the bulkhead unit with a force fit, with a form fit and/or with material fusion. A perforated strip may be arranged on the bulkhead unit and the support construction may comprise pins which are inserted into the perforated strip to achieve coupling with a form fit.

According to one development, a covering completely surrounds the tail structure. This covering may be formed on aerodynamic principles. In the covering can be arranged large-area flaps which permit easy access to the craft components in the tail structure.

BRIEF DESCRIPTION OF THE DRAWINGS

The present invention is explained in more detail below with reference to preferred exemplary embodiments and to the appended figures, in which.

Unless stated to the contrary, like reference numbers in the figures denote like or functionally equivalent components.

DETAILED DESCRIPTION OF THE INVENTION

Figure 1:
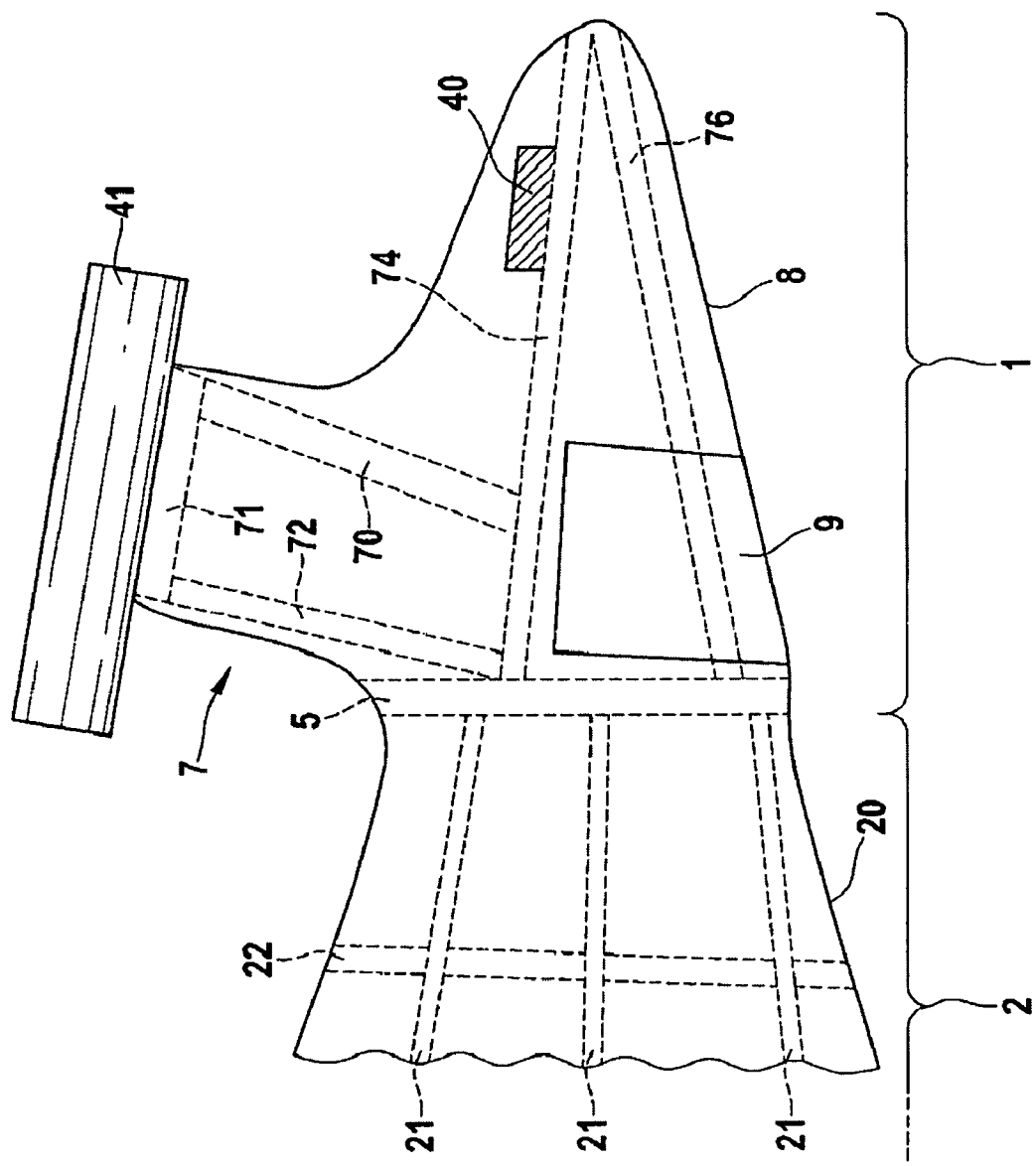
FIG. 1 shows a side view of a tail structure according to an exemplary embodiment of the present invention.
Figure 2:
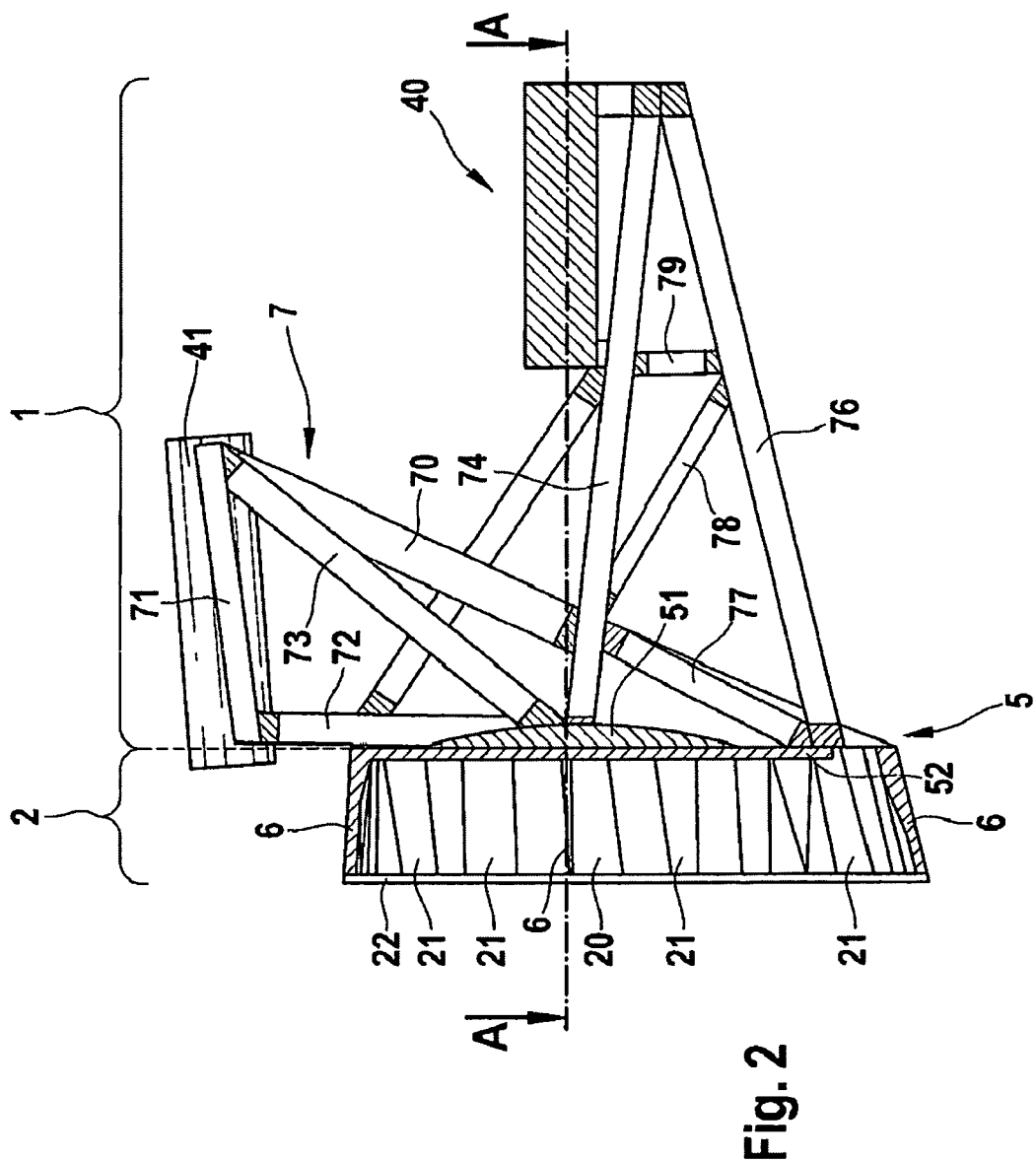
FIG. 2 shows an internal view of the tail structure from FIG. 1 without the outer skin.
Figure 3:
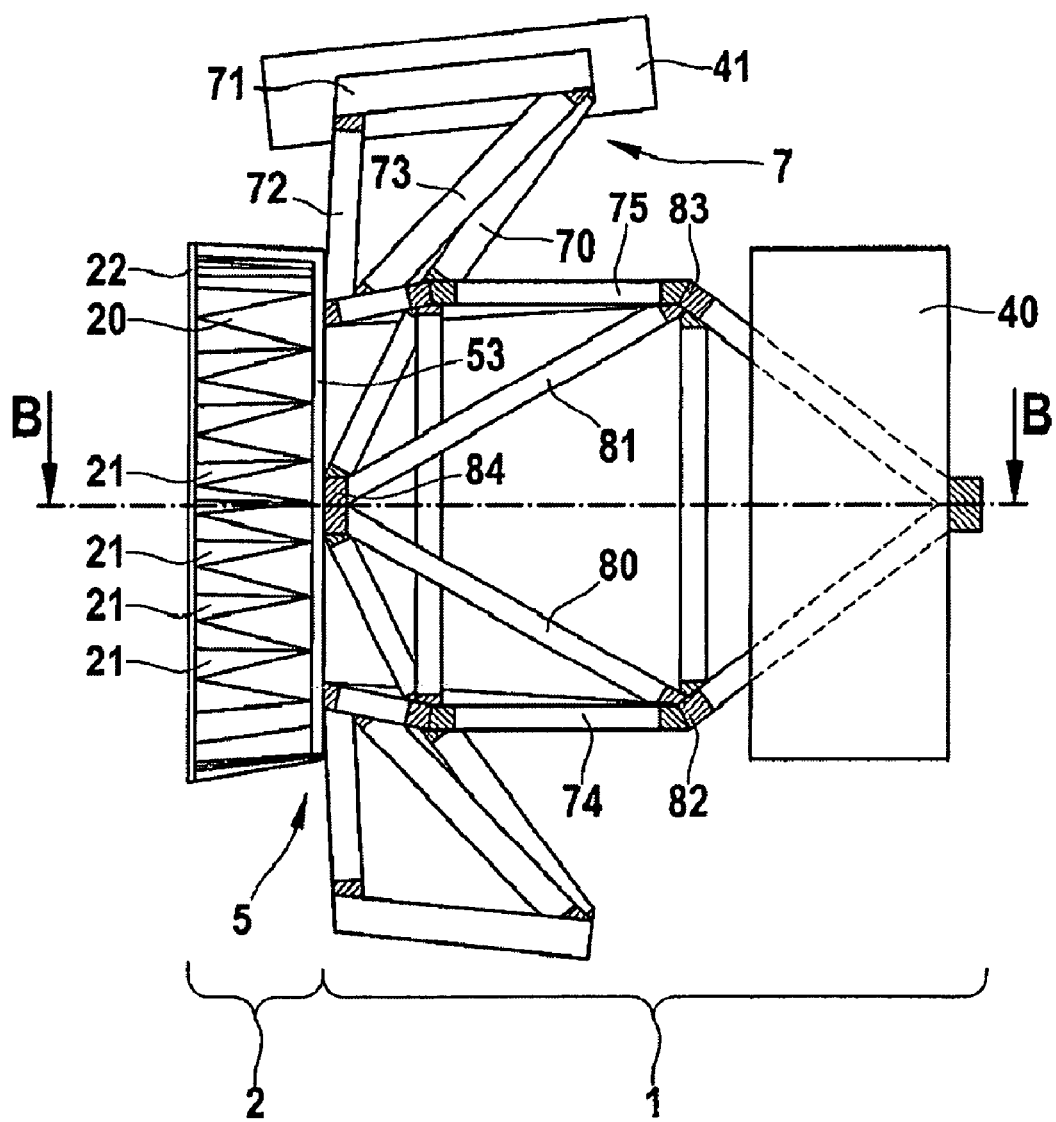
FIG. 3 shows a plan view of the tail structure from FIG. 2.

A particular embodiment of the tail structure 1 is explained in more detail below in conjunction with FIGS. 1 to 3. FIG. 1 shows the tail structure in a side view from outside, FIG. 2 shows the same side view, but with an outer casing removed, and FIG. 3 shows a plan view of the tail structure without the outer casing. The tail structure 1 directly adjoins a fuselage section 2. The fuselage section 2 is embodied as a monocoque structure as conventionally used for commercial aircraft. To this end, it comprises a stressed outer skin 20 which substantially has a circular or elliptical cross section. The stressed outer casing 20 is supported by internal longitudinally extending stringers 21 and frames 22 arranged transversely to them. The frames 22 advantageously have a form corresponding to the cross section of the outer casing 20. The skeleton, which is formed by the stringers 21 and the frames 22, for its part has only a low mechanical load-bearing capacity, if any. The load-bearing capacity is imparted to the fuselage section 2 for example by way of the outer casing 20 alone.

According to the present embodiment, the tail section or the tail structure 1 is likewise covered with an outer casing 8. This is designated fairing 8 below.

Unlike the outer casing 20 in the fuselage section 2, the fairing 8 does not have a load-bearing function. It serves solely as a covering. Since the fairing 8 is not subjected to forces, the fairing 8 can be designed with a substantial degree of freedom. Consequently, the fairing 8 can be optimally tailored to the aerodynamic requirements. In addition, large flaps 9 can be arranged in the tail structure 1, these flaps facilitating access to the interior of the tail structure. These large flaps 9 may at the same time also serve as pressure-equalizing means in the event of decompression, in which case they immediately burst open.

For example, two pylons 7 in the tail structure support a respective engine 41. According to the present exemplary embodiment, the pylons 7 are covered by the fairing 8 right up to their edge towards the engine 41. A fireproof or heat-resistant sleeve may seal the fairing 8 at the contact face with the engine 41. A further embodiment has no engine or has a single engine on the tail structure. Accordingly, the number of pylons in this case is also reduced.

The tail structure 1 may also comprise a stabilizing unit 40. In the embodiment represented, the stabilizing unit comprises only an elevator. Lateral steering is achieved by different thrusts from the two engines 41. However, the tail structure 1 may also comprise a vertical stabilizer.

The side view in FIG. 2 and the plan view in FIG. 3 show a possible design of the tail structure 1 comprising a support construction 3 and a bulkhead unit 5. FIG. 3 represents the section along the plane A-A in FIG. 2, and FIG. 2 represents the section along the plane B-B in FIG. 3.

The bulkhead unit 5 seals the pressure-exposed interior of the fuselage section 2 in a pressure-tight manner. The bulkhead unit 5 can be coupled and mechanically connected to the fuselage section via coupling elements 6. These coupling elements 6 may be connected to the longitudinally extending stringers 21, which in turn are coupled to the stressed outer casing 20.

The bulkhead unit 5, or the pressure bulkhead 5, is for example planar in form. This results in greater freedoms of design, such as the installation of a door in the pressure bulkhead 5, for example.

Owing to the pressure difference between the interior of the fuselage section 2 and the tail structure 1, forces in the longitudinal direction act on the pressure bulkhead 5. To ensure that the pressure bulkhead 5 has sufficient mechanical stability with respect to these forces, it may be provided with bracing extending within it and/or with bracing 52, 53 extending on its outer side. In addition, a pressure dome 51 may be integrated in the pressure bulkhead 5.

The support construction 3 of the tail structure 1 is advantageously coupled to the pressure bulkhead. Consequently, forces which act on the support structure 3 are propagated directly through the pressure bulkhead 5 to the outer casing 20 of the fuselage section 2. A corresponding force flow also exists in the opposite direction.

The support structure 3 illustrated by way of example in FIGS. 2 and 3 may be configured as a support bar construction. According to this exemplary embodiment, a pyramid-shaped base structure is formed by four support bars 74, 75, 76 (the fourth support bar can only be seen in perspective views). In this arrangement, the support bar ends at the imaginary base of the pyramid-based structure are coupled to the pressure bulkhead 5. The pyramid-shaped support bar construction serves inter alia for supporting the stabilizing unit 40. The stabilizing unit 40 is arranged in the rear region of the pyramid-shaped base structure.

When steering is carried out using the elevator of the stabilizing unit 40 or, if present, using the rudder of a vertical stabilizer, torsional forces act on the pyramid-shaped base structure. In the rear region of the base structure, i.e. near the apex, the base structure does not have sufficient rigidity with respect to such torsional forces. An oblique strut 80 connects a suspension point 82 of the stabilizing unit to a suspension point 84 on the pressure bulkhead 5. The suspension point 82 of the stabilizing unit 40 is situated laterally at a distance from the longitudinal axis of the tail section. In relation to the first oblique strut 80, a second oblique strut extends symmetrically with respect to the longitudinal axis of the tail section and is coupled to a second suspension point 83. These two additional oblique struts 80, or, if appropriate, still further oblique struts, increase the torsional rigidity of the base structure. The suspension point 84 on the pressure bulkhead 5 is for example arranged in a plane perpendicular to the longitudinal axis of the tail structure 1.

It is possible for example for pylons 7 which serve to support an engine 41 to be fastened to the base structure. When use is made of two engines 41, it may in certain circumstances be possible to dispense with the use of a vertical stabilizer. The pylons have a substantially cuboidal or parallelepipedal base structure. This shape is formed by the support bars 70, 71 and 72. To ensure that the thrusts from the engine 41 are transmitted to the base structure of the support structure 3, at least one diagonal support bar 73 is additionally arranged within the pylon. The pylon may be surrounded by its own inner covering (not shown), inside which the feed lines to the engine 41 extend and/or the waste heat from the engine is usefully bled off to heat the passenger compartments.

When only one engine is used in the tail region, the pylon is oriented vertically. When using two engines, the pylons for example have an incline with respect to the vertical.

Figure 4:
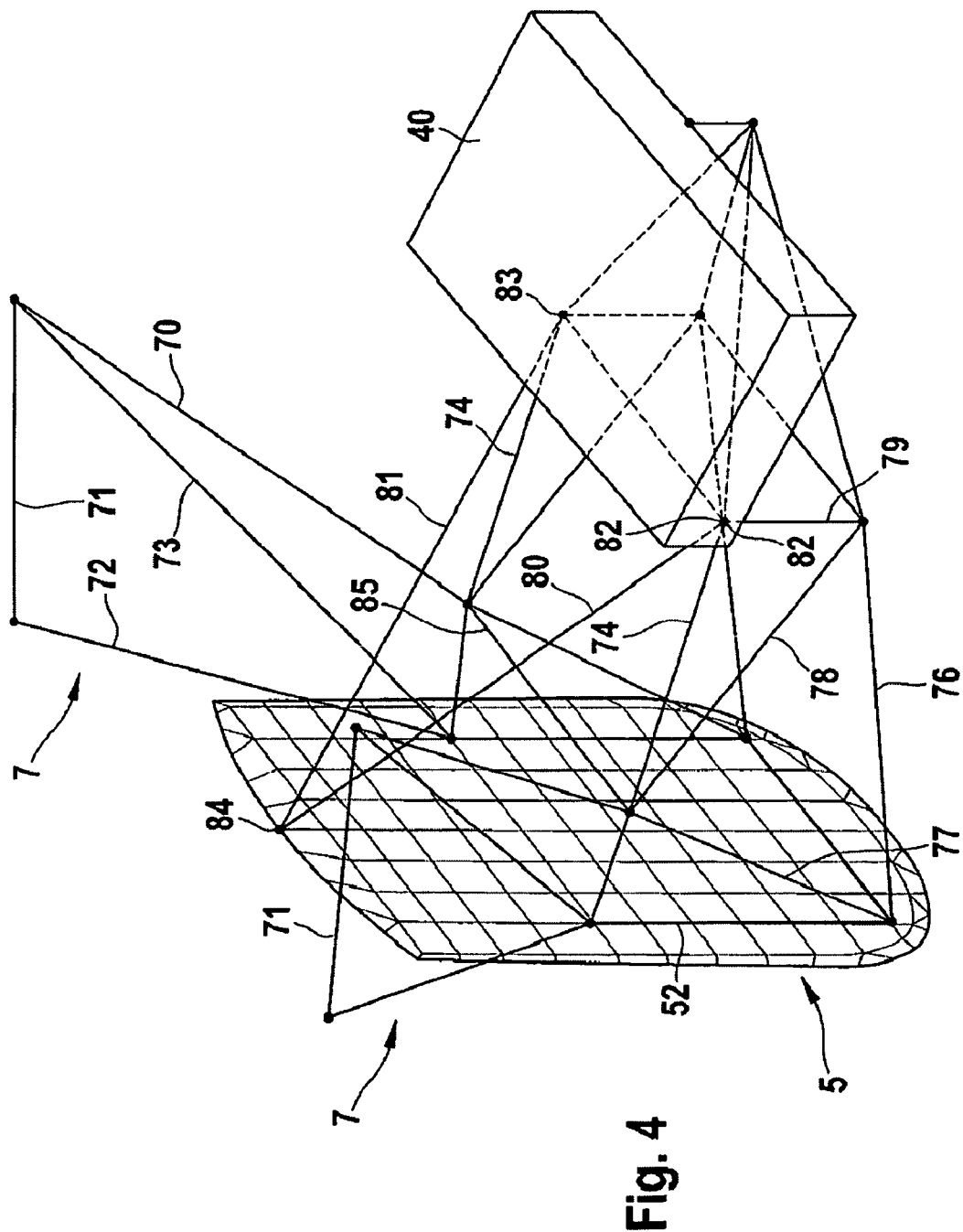
FIG. 4 shows a three-dimensional line illustration of the tail structure from the preceding figures.
Figure 5:
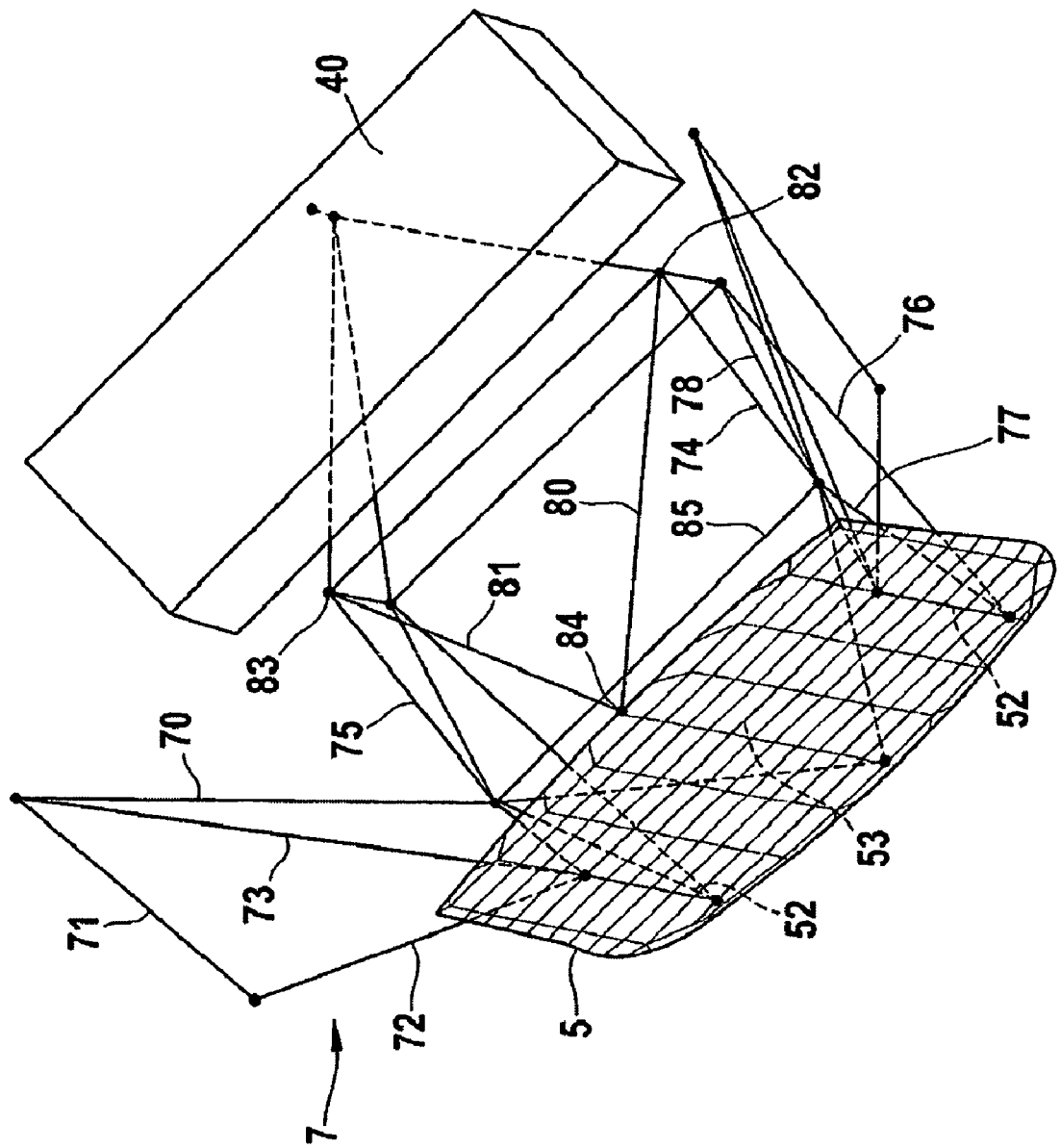
FIG. 5 shows a further three-dimensional line illustration of the embodiment of the preceding figures.

In FIGS. 4 and 5, two three-dimensional representations of the above-described exemplary tail structure are illustrated. The bars, supports and the bulkhead 5 are reduced to lines or surfaces to simplify the representation. Furthermore, the couplings of the individual support bars and elements are indicated by dots.

FIG. 4 shows two pylons 7. A transverse strut 85 is used to connect the pylons to one another laterally in order to achieve greater rigidity. The further components in FIGS. 4 and 5 have already been described in conjunction with FIGS. 1 to 3.

Figure 6:
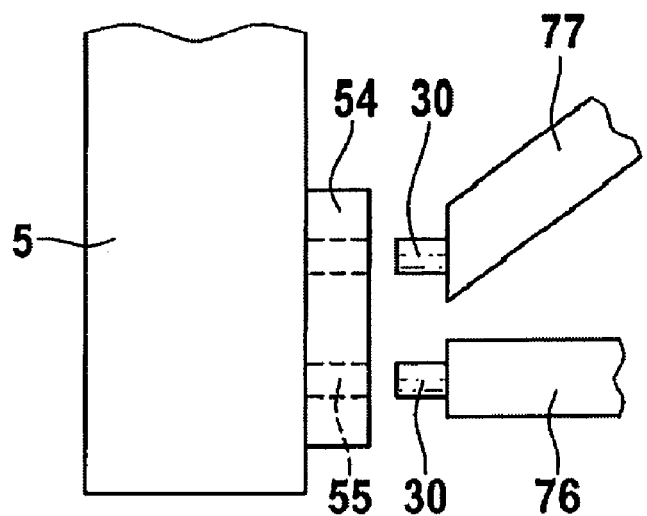
FIG. 6 shows a detail view of a connecting piece of the embodiment of the preceding figures.

FIG. 6 illustrates a possible embodiment of a coupling of the support bars to the pressure bulkhead. A perforated strip 54 having a number of bores 55 is riveted to the pressure bulkhead. The perforated strip 54 can be made of high-strength and corrosion-resistant titanium. This makes it possible to achieve a higher degree of corrosion resistance than obtained by the fibre composite materials of which at least part of the pressure bulkhead 5 is made. The bars, here by way of example the support bars 76 and 77, comprise pins 30 which can be inserted into the bores 55. This results in a form-fit connection. The pins can be secured in the bores 55 by means of additional perpendicularly extending bolts. This is only one of many possible ways of connecting the support bars to the pressure bulkhead 5.

Figure 7:
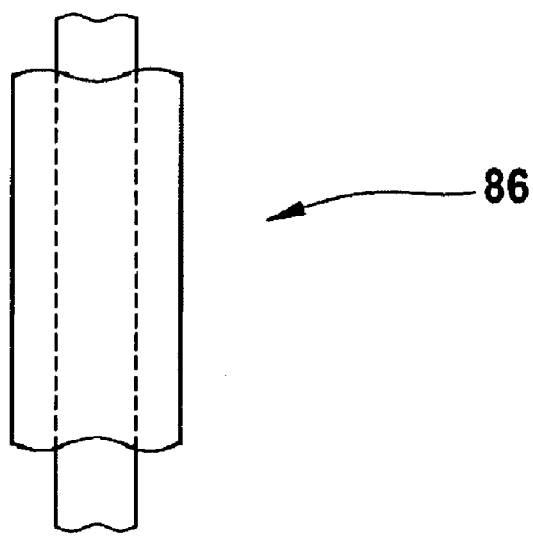
FIG. 7 shows a schematic representation of a double-walled tube.

FIG. 7 schematically shows a double-walled tube 86 which consists of an inner tube and an outer tube. Such tubes may, for example, be used in the pylons 7 to ensure increased security against fracture and/or to obtain failsafe properties.

Although the present invention has been described here with reference to exemplary embodiments, it is not restricted thereto, but can be modified in a wide variety of ways.

In particular, the geometry of the support structure can be modified in a wide variety of ways.

What is claimed is:

1. A combination of a tail structure and a fuselage section, the tail structure adjoining the fuselage section, the tail structure comprising:
   A support construction supporting two engines; and
   A bulkhead unit in a sealing the fuselage section in a pressure tight manner, the bulkhead unit being connected both to the support construction and to the fuselage section so as to form a force flow path between a respective engine and the fuselage section;
   Wherein the support construction comprises two pylons which are connected to the respective engine and support the respective engine, and
   Wherein the pylons are formed by a parallelepiped-defining support bar construction with at least one support bar extending diagonally in the parallelepiped, wherein the support construction has a pyramid-shaped base structure made of four support bars for supporting a stabilizing unit, wherein the pylons are fastened to the pyramid-shaped base structure, wherein the support construction has two oblique struts.

2. The combination according to claim 1, wherein the two oblique struts each connecting a first suspension point in a connection region of the stabilizing unit and a second suspension point at the fuselage section, the first suspension point being displaced horizontally with respect to a vertical symmetry plane of the tail structure, and the second suspension point being arranged in the vertical symmetry plane, wherein the stabilizing unit and the bulkhead unit are coupled together via the at least two oblique struts.

3. The combination according to claim 1, comprising a covering for covering the support construction, the covering providing no support function.

4. The combination according to claim 3, wherein the covering completely surrounds the tail structure.

5. The combination according to claim 3, wherein flaps for access to craft components are arranged in the covering.

6. The combination according to claim 1, wherein the support construction comprises double-walled support bars.

7. An aircraft or spacecraft comprising a combination according to any of the preceding claims.

* * * * *